United States Patent
Guinart et al.

(10) Patent No.: US 12,059,931 B2
(45) Date of Patent: Aug. 13, 2024

(54) METHOD FOR DETECTING A CHANGE IN LOCATION OF THE WHEELS OF A MOTOR VEHICLE

(71) Applicant: Continental Automotive Technologies GmbH, Hannover (DE)

(72) Inventors: Nicolas Guinart, Toulouse (FR); Jean-Phillippe Boisset, Toulouse (FR); Sylvain Godet, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 88 days.

(21) Appl. No.: 18/024,561

(22) PCT Filed: Aug. 25, 2021

(86) PCT No.: PCT/EP2021/073463
§ 371 (c)(1),
(2) Date: Mar. 3, 2023

(87) PCT Pub. No.: WO2022/048961
PCT Pub. Date: Mar. 10, 2022

(65) Prior Publication Data
US 2023/0271462 A1    Aug. 31, 2023

(30) Foreign Application Priority Data
Sep. 4, 2020 (FR) ....................................... 2008998

(51) Int. Cl.
*B60C 23/04* (2006.01)
(52) U.S. Cl.
CPC ...... *B60C 23/0415* (2013.01); *B60C 23/0438* (2013.01); *B60C 23/0461* (2013.01)

(58) Field of Classification Search
CPC . B60C 23/00; B60C 23/0489; B60C 23/0416; B60C 23/0437; B60C 23/0488
See application file for complete search history.

(56) References Cited

U.S. PATENT DOCUMENTS 6,469,621 B1    10/2002    Vredevoogd et al.
6,489,888 B1    12/2002    Honeck et al.
(Continued)

FOREIGN PATENT DOCUMENTS

DE    102011004561 A1    8/2012
DE    102015115731 A1    3/2017
(Continued)

OTHER PUBLICATIONS

English Translation of the Written Opinion for International Application No. PCT/EP2021/073463, mailed Oct. 19, 2021, 6 pages.
(Continued)

*Primary Examiner* — Mirza F Alam
(74) *Attorney, Agent, or Firm* — Buchanan, Ingersoll & Rooney, PC

(57) ABSTRACT

A method for detecting a change in location of the wheels of a motor vehicle, the vehicle having at least one central processing unit, and two wheel units which each includes an electronic assembly of sensors and which are each mounted on one of the wheels. The method including a monitoring step, during which a first pattern representative of the location of the wheel unit is established, when the vehicle is at a standstill, and an evaluation step, during which a possible first variation in each first pattern is measured to estimate if the location of the wheel has changed.

11 Claims, 2 Drawing Sheets

(56) References Cited

U.S. PATENT DOCUMENTS

| | | | |
|---|---|---|---|
| 8,978,460 | B2 | 3/2015 | Kretschmann |
| 10,449,810 | B2 | 10/2019 | Guinart et al. |
| 2006/0012475 | A1 | 1/2006 | Froitzheim et al. |
| 2011/0304451 | A1 | 12/2011 | Lickfelt et al. |
| 2012/0029767 | A1* | 2/2012 | Bailie ............... B60C 23/0416 701/36 |
| 2015/0057878 | A1* | 2/2015 | Friel ................ B60C 23/0488 701/33.7 |
| 2017/0190224 | A1* | 7/2017 | Araya ............... B60C 23/0408 |
| 2021/0268849 | A1* | 9/2021 | Kretschmann ...... B60C 23/0437 |
| 2023/0160920 | A1* | 5/2023 | Kosugi .............. B60C 23/0416 73/494 |

FOREIGN PATENT DOCUMENTS

| | | |
|---|---|---|
| EP | 2537689 A1 | 12/2012 |
| WO | 2012139711 A1 | 10/2012 |
| WO | 2019092052 A1 | 5/2019 |
| WO | 2019243374 A1 | 12/2019 |

OTHER PUBLICATIONS

International Search Report and Written Opinion for International Application No. PCT/EP2021/073505, mailed Oct. 21, 2021 with translation, 8 pages.
International Search Report and Written Opinion for International Application No. PCT/EP2021/073505, mailed Oct. 21, 2021, 12 pages (French).
French Search Report for French Application No. 2008995, dated Jun. 9, 2021 with translation, 9 pages.
International Search Report and Written Opinion for International Application No. PCT/EP2021/074289, mailed Oct. 1, 2021, 7 pages.
International Search Report and Written Opinion for International Application No. PCT/EP2021/074289, mailed Oct. 1, 2021, 11 pages (French).
French Search Report for French Application No. 2008997, dated Apr. 20, 2021 with translation, 9 pages.
International Search Report and Written Opinion for International Application No. PCT/EP2021/073463, mailed Oct. 19, 2021, 7 pages.
International Search Report and Written Opinion for International Application No. PCT/EP2021/073463, mailed Oct. 19, 2021, 11 pages (French).
French Search Report for French Application No. 2008998, dated Jul. 5, 2021 with translation, 9 pages.
English Translation of the Written Opinion for International Application No. PCT/EP2021/073505, mailed Oct. 21, 2021, 6 pages.
Notice of Allowance for U.S. Appl. No. 18/024,551, mailed Sep. 1, 2023, 8 pages.

* cited by examiner

METHOD FOR DETECTING A CHANGE IN LOCATION OF THE WHEELS OF A MOTOR VEHICLE

CROSS REFERENCE TO RELATED APPLICATIONS

This application is the U.S. National Phase Application of PCT International Application No. PCT/EP2021/073463, filed Aug. 25, 2021, which claims priority to French Patent Application No. FR2008998, filed Sep. 4, 2020, the contents of such applications being incorporated by reference herein.

FIELD OF THE INVENTION

The present patent application relates to a method for detecting a change in location of the wheels of a motor vehicle, this method having applications notably in the field of equipment for motor vehicles.

BACKGROUND OF THE INVENTION

For security purposes, it is known to equip a motor vehicle with a monitoring system known by the acronym "TPMS" (Tire Pressure Monitoring System).

Such a monitoring system generally has a central processing unit, wheel units, each of which equips an associated wheel of the vehicle, and a radiofrequency communications assembly suitable for ensuring communication between each wheel unit and the central processing unit.

The central unit has an electronic processor known by the abbreviation "ECU" (Electronic Control Unit).

Each wheel unit comprises an electronic assembly of sensors in order notably to detect an anomaly with the wheel. These sensors may, for example, be a tire inflation pressure sensor, a temperature sensor and a wheel acceleration sensor.

In addition, each wheel unit has a battery and a memory.

The communications assembly makes it possible to exchange messages, or signals, bidirectionally between the central unit, and/or a mobile terminal, and each wheel unit. The messages notably include data representative of the operating parameters of each wheel and an identification code for each wheel unit.

The communication is done according to a communication protocol for the short-range bidirectional exchange of data using ultra-high-frequency, or "UHF", radio waves, for example according to a communication protocol of the Bluetooth® type.

It is essential to know the location of each wheel unit on the various wheels of the vehicle in order to utilize the data transmitted by the wheel units. More particularly, the location information is necessary in order to know what recommended pressure threshold must be applied, depending on whether it is a question of a front wheel or a rear wheel, and also to display the current pressure values at the associated wheel.

The location of the wheel units in relation to a wheel location in the vehicle is generally verified at the start of a new running cycle and requires, according to the existing prior art, periodic transmissions of messages synchronized with a determined angular position from the wheel unit to the central unit.

To that end, notably known is document WO 2012/139711, incorporated herein by reference, which describes a method for locating the wheels of a motor vehicle by synchronized messages.

The energy necessary to transmit the messages from each wheel unit is supplied by the battery associated with the emitting wheel unit.

However, the battery of each wheel unit has a limited service life and is not intended to be recharged. It is therefore imperative to limit the energy consumption in order to optimize the service life of the battery of each wheel unit.

In addition, it is noted that, when the location of the wheel units is verified at the start of each running cycle, this produces an unchanged result for the location of the wheel units most of the time. This is because the wheels are changed or switched over only once or twice per year on average, notably when there is a changeover between winter tires and summer tires, which is a proportion of the effective change in the location of the wheel units that represents less than one percent of the wheel unit location procedures.

Also known is a method for verifying a change in location of the wheel units, described in document US 2011/0304451, incorporated herein by reference, which queries each wheel unit when the engine is started up in order to determine whether the location of the wheel units has changed since the last time the engine was started up.

Although such a method makes it possible to limit the procedures for verifying the location of the wheel units, this method is complex to implement and requires an assembly of supplementary components for each wheel unit, such as a dedicated low-frequency antenna, a low-frequency controller, and dedicated wiring.

The existing prior art does not provide a simple and reliable solution ensuring the detection of a change in location of the wheel units with a low expense in terms of energy.

SUMMARY OF THE INVENTION

An aspect of the present invention notably aims to resolve these drawbacks.

This objective, and others that will become apparent from reading the following description, is achieved by a method for detecting a change in location of the wheels of a motor vehicle, said vehicle having at least:
  one central processing unit,
  two wheel units which each comprise an electronic assembly of sensors and which are each mounted on one of said wheels of the motor vehicle, and
  one bidirectional radiofrequency communications assembly designed to ensure communication between the wheel units and the central unit,
  characterized in that the method includes at least:
  a monitoring step, during which each wheel unit emits series of messages to the central unit via the communications assembly depending on a determined emission rate, when the motor vehicle is at a standstill, and the central unit establishes and records, for each wheel unit, a first pattern representative of the location of the wheel unit in the motor vehicle, by measuring the power of said received messages,
  an evaluation step, during which the central unit measures a possible first variation in each first pattern and the central unit compares said first variation with a first predetermined threshold value, the location of the wheel in question is estimated to have changed if said first measured variation is greater than the first predetermined threshold value, and
  a locating step, which aims to determine the location of the wheels on the motor vehicle and which is implemented if the location of at least two wheels is estimated to have changed during the preceding evaluation step.

According to other optional features of the method according to an aspect of the invention, taken individually or in combination:

the rate of emission of the series of messages from each wheel unit is adapted depending on the instantaneous variation in the first pattern of the wheel unit in question, measured during the evaluation step. This feature makes it possible to limit the number of messages emitted so as to limit the stressing of the battery of each wheel unit;

the rate of emission of the series of messages by each wheel unit is determined by the central unit and transmitted to each wheel unit via the communications assembly;

the central unit, in response to the received messages, emits series of messages to each wheel unit via the communications assembly, and each wheel unit establishes and records a second pattern representative of the location of the wheel unit in the motor vehicle, by measuring the power of the received messages and, during the evaluation step, each wheel unit measures a possible second variation in the associated second pattern and compares said second variation with a second predetermined threshold value, the location of the wheel in question is estimated to have changed if said measured second variation is greater than the second predetermined threshold value. This feature, by doubling the emissions of messages, enables the method to be made more reliable;

the rate of emission of the series of messages by each wheel unit is adapted depending on the instantaneous variation in the second pattern of the wheel unit in question;

the method is applied to a motor vehicle having four wheels which are each associated with one wheel unit, said wheels forming a first lateral pair and a second, opposite lateral pair, and also a first front pair and a second, opposite rear pair, the location of the wheels is estimated as unchanged if the measured variation in each pattern of two wheel units of one and the same pair of wheels is simultaneous;

said motor vehicle has a plurality of central processing units, each central unit being designed to communicate with each wheel unit via the bidirectional communications assembly;

each pattern is established by measuring the power of the received messages.

An aspect of the present invention also relates to a motor vehicle comprising at least one central processing unit, two wheel units which each comprise an electronic assembly of sensors and which are each mounted on one of said wheels of the motor vehicle, and one bidirectional radiofrequency communications assembly designed to ensure communication between the wheel units and the central unit, characterized in that said central unit and/or said wheel units and/or said communications assembly are suitably programmed to implement the method described above.

BRIEF DESCRIPTION OF THE DRAWINGS

Other features and advantages of aspects of the invention will become apparent on reading the following description, with reference to the appended figures, in which.

For greater clarity, identical or similar elements are denoted by identical or similar reference signs throughout the figures.

DETAILED DESCRIPTION OF THE PREFERRED EMBODIMENTS

Figure 1:
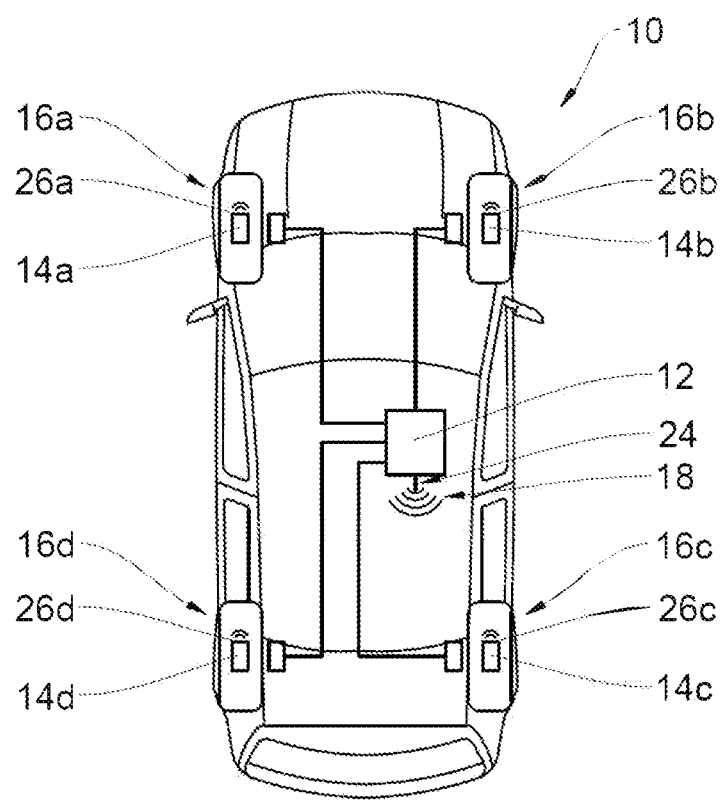
FIG. 1: illustrates a schematic view of a motor vehicle equipped with wheel units and a communications assembly, to which vehicle the method according to an aspect of the invention is applied.

FIG. 1 depicts a motor vehicle 10 which is equipped with a central processing unit 12, with four wheel units 14a, 14b, 14c, 14d which are each mounted on an associated wheel 16a, 16b, 16c, 16d, and with a bidirectional communications assembly 18. The four wheels 16a, 16b, 16c, 16d form a first, left-hand lateral pair of wheels referenced 16a, 16d and a second, opposite right-hand lateral pair of wheels referenced 16b, 16c, and also a first front pair of wheels referenced 16a, 16b and a second, opposite rear pair of wheels referenced 16c, 16d.

The central unit 12 notably has an electronic processor known by the abbreviation "ECU" (Electronic Control Unit), and a memory.

Each wheel unit 14a, 14b, 14c, 14d, which are part of a monitoring system of the "TPMS" type, comprises an electronics housing containing an assembly of sensors which are dedicated to measuring parameters such as the pressure and the temperature of the tire with which the associated wheel 16a, 16b, 16c, 16d is equipped. Each wheel unit 14a, 14b, 14c, 14d also has a battery and a memory (which are not depicted).

The communications assembly 18 makes it possible to exchange messages, or signals, bidirectionally between the central unit 12 and each wheel unit 14a, 14b, 14c, 14d.

For that purpose, the communications assembly 18 has an emitter-receiver 24 which is associated with the central unit 12 and four emitter-receivers 26a, 26b, 26c, 26d which are each associated with one wheel unit 14a, 14b, 14c, 14d, respectively.

The messages exchanged between the central unit 12 and each wheel unit 14a, 14b, 14c, 14d notably include data representative of operating parameters of each wheel 16a, 16b, 16c, 16d and an identification code for each wheel unit 14a, 14b, 14c, 14d.

The communication is done according to a communication protocol for the short-range bidirectional exchange of data using ultra-high-frequency, or "UHF", radio waves. As a preference, the method according to an aspect of the invention adopts a communication protocol of the Bluetooth® type which makes it possible to immediately emit a message referred to as "scan request" in response to a received message known as "advertising".

According to a first embodiment of the invention, the method includes a monitoring step, during which each wheel unit 14a, 14b, 14c, 14d emits series of messages to the central unit 12 via the communications assembly 18 depending on a determined emission rate.

The rate of emission of the series of messages is, for example, thirty seconds, that is to say that a series of messages is emitted every thirty seconds.

It is also the case that the monitoring step is implemented when the motor vehicle 10 is at a standstill, and continues until the start of the next running cycle of the motor vehicle 10. It will be noted that the emission of messages from the wheel units 14a, 14b, 14c, 14d is a typical action that is provided within the scope of a monitoring system of the "TPMS" type, notably for the purpose of transmitting information to a mobile terminal of a user.

Upon receiving the messages, the central unit 12 establishes and records in its memory, for each wheel unit 14a, 14b, 14c, 14d, a first pattern M1, which is representative of the location of the wheel unit 14a, 14b, 14c, 14d in question in the motor vehicle 10. The starting assumption is that the location of each wheel 16a, 16b, 16c, 16d is known and correct at the time at which the first patterns M1 are established.

Each first pattern M1 is established by the central unit 12 by measuring the power of the messages received by the wheel units 14a, 14b, 14c, 14d.

The power of the received messages is known in telecommunications by the acronym RSSI, which stands for Received Signal Strength Indication and which is a measure of the power of a received signal on reception, and gives an indication as to the signal strength of the received signal. This measure of power is expressed in "dBm", which is an abbreviation for the ratio of the power in decibels between the measured power and one milliwatt.

Thus, a "pattern" means a characteristic signature of the messages, or signals, emitted and/or received by a wheel unit 14a, 14b, 14c, 14d or by the central unit 12 via the communications assembly 18. Each pattern is representative of the location, in the motor vehicle 10, of the associated wheel unit 14a, 14b, 14c, 14d that emits or receives the messages.

Figure 2:
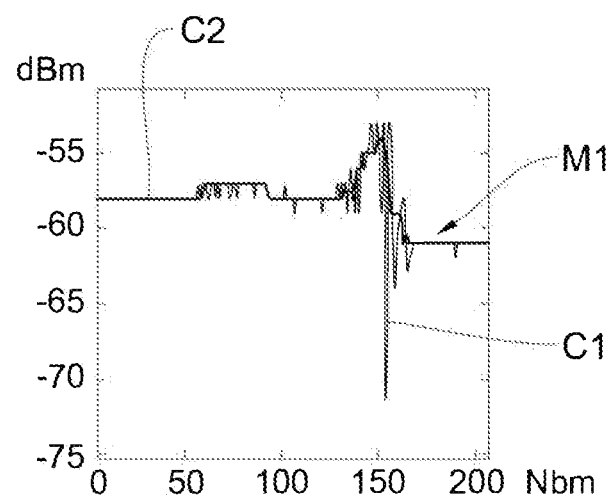
FIG. 2: depicts, in the form of a graph, variations in a first pattern M1 representative of the location of one of the wheel units.

As can be seen in FIG. 2, the first pattern M1, associated with the first, front left wheel unit 14a, for example, takes the form of a depiction in the form of a graph, with the abscissa axis indicating the number of received messages "Nbm" and the ordinate axis indicating the power of the messages, measured in "dBm". The curve C1 illustrates the measurements of the power of the received messages and the curve C2, which illustrates the first pattern M1, is a smoothed curve of the average of the measurements of the power of the received messages.

In addition, the method according to an aspect of the invention includes an evaluation step, during which the central unit 12 measures a possible first variation in each first pattern M1.

The central unit 12 also compares the first variation with a first predetermined threshold value. The location of the wheel 16a, 16b, 16c, 16d in question is estimated to have changed if the first measured variation is greater than the first predetermined threshold value. The predetermined threshold value is, for example, five dBm. It will be noted that the variation is a value averaged over time, to avoid taking an unwanted unknown into account. For example, the variation is averaged over a period of three to five minutes.

Lastly, the method comprises a locating step, which aims to determine the location of the wheels 16a, 16b, 16c, 16d on the motor vehicle 10. This locating step, which is known from the prior art, is not at the heart of an aspect of the present invention and will therefore not be described in more detail.

According to a preferred exemplary embodiment, the location of the wheels 16a, 16b, 16c, 16d is estimated as unchanged if the measured variation in the first pattern M1 of two wheel units 14a, 14b, 14c, 14d of one and the same pair of wheels is simultaneous. For example, assuming that the wheel units 14a, 14d of the first, left-hand lateral pair of wheels 16a, 16d have measured variations in their associated first pattern M1 that are simultaneous, the locating step will not be implemented. This feature of an aspect of the invention covers the situation in which a neighboring vehicle has parked to the side of, or in front of, or behind, the motor vehicle 10 and, due to the reflection effect of the radio wave, the power of the messages of the two wheels 16a, 16b, 16c, 16d of one and the same pair of wheels varies at the same time.

However, nonlimitingly, it is conceivable to implement the locating step if the location of at least two wheels 16a, 16b, 16c, 16d, irrespective of the pair of wheels in question, is estimated to have changed during the evaluation step.

According to another aspect of the invention, the rate of emission of the series of messages from each wheel unit 14a, 14b, 14c, 14d via the communications assembly 18 is adapted depending on the instantaneous variation in the first pattern M1 of the wheel unit 14a, 14b, 14c, 14d in question, measured during the evaluation step. For example, the nominal emission period for the series of messages is from ten to thirty seconds. When a variation in the first pattern M1 is observed for one of the wheel units 14a, 14b, 14c, 14d, for example 2.5 dBm, the emission frequency is doubled, or even quadrupled for the wheel unit 14a, 14b, 14c, 14d in question. If no gradient greater than 2.5 dBm is observed for five minutes, there is a return to the nominal emission period.

The rate of emission of the series of messages from each wheel unit 14a, 14b, 14c, 14d is determined by the central unit 12 and transmitted to each wheel unit 14a, 14b, 14c, 14d via the communications assembly 18.

Figure 3:
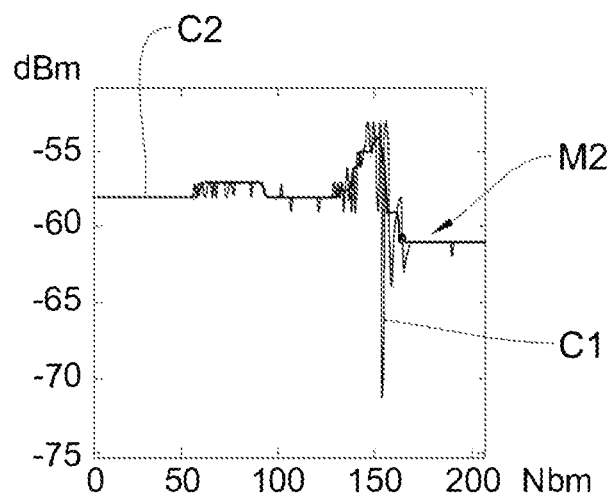
FIG. 3: depicts, in the form of a graph, variations in a second pattern M2 representative of the location of one of the wheel units.

According to a second embodiment of the invention, the central unit 12, in response to the received messages, emits series of messages to each wheel unit 14a, 14b, 14c, 14d via the communications assembly 18, and each wheel unit 14a, 14b, 14c, 14d establishes and records a second pattern M2, illustrated in FIG. 3, representative of the location of the wheel unit 14a, 14b, 14c, 14d in question in the motor vehicle 10, by measuring the power of the messages received from the central unit 12.

As can be seen in FIG. 3, the second pattern M2 takes the form of a depiction in the form of a graph, with the abscissa axis indicating the number of measurements of received messages "Nbm" and the ordinate axis indicating the power of the messages, measured in "dBm". The curve C1 illustrates the measurements of the power of the received messages and the curve C2, which illustrates the second pattern M2, is a smoothed curve of the average of the measurements of the power of the received messages.

According to this second embodiment of the invention, during the evaluation step, each wheel unit 14a, 14b, 14c, 14d measures a possible second variation in the associated second pattern M2 and compares this second variation with a second predetermined threshold value. The location of the wheel 16a, 16b, 16c, 16d in question is estimated to have changed if the measured second variation is greater than the second predetermined threshold value.

It is also the case, like for the first embodiment of the invention, that the rate of emission of the series of messages by each wheel unit 14a, 14b, 14c, 14d is adapted depending on the instantaneous variation in the second pattern M2 of the wheel unit 14a, 14b, 14c, 14d in question.

According to an embodiment variant which is common to the two embodiments described above, the motor vehicle 10 has a plurality of central processing units 12, each central unit 12 being designed to communicate with each wheel unit 14a, 14b, 14c, 14d via the bidirectional communications assembly 18.

Thus, during the monitoring step, each wheel unit 14a, 14b, 14c, 14d emits series of messages to each central unit 12, and, during the evaluation step, each central unit 12 measures a possible first variation in each first pattern M1. The use of multiple central processing units 12 makes it possible to improve the reliability and the robustness of the method according to an aspect of the invention.

The invention claimed is:

1. A method for detecting a change in location of the wheels of a motor vehicle, said vehicle having at least:
   one processor,
   two wheel units which each comprise an electronic assembly of sensors and which are each mounted on one of said wheels of the motor vehicle, and
   one bidirectional radiofrequency communications assembly designed to ensure communication between the wheel units and the processor,
   wherein the method includes at least:
   a monitoring step, during which each wheel unit emits series of messages to the processor via the communications assembly depending on a determined emission rate, when the motor vehicle is at a standstill, and the processor establishes and records, for each wheel unit, a first pattern representative of the location of the wheel unit in the motor vehicle, by measuring a power of said received messages, wherein the power of the received messages is a Received Signal Strength Indication (RSSI) of the received messages, an evaluation step, during which the processor measures a possible first variation in each first pattern and the processor compares said first variation with a first predetermined threshold value, the location of the wheel in question is estimated to have changed if said first measured variation is greater than the first predetermined threshold value, and
   a locating step, which aims to determine the location of the wheels on the motor vehicle and which is implemented if the location of at least two wheels is estimated to have changed during the preceding evaluation step.

2. The detection method as claimed in claim 1, wherein the rate of emission of the series of messages from each wheel unit is adapted depending on the instantaneous variation in the first pattern of the wheel unit in question, measured during the evaluation step.

3. The detection method as claimed in claim 2, wherein the rate of emission of the series of messages by each wheel unit is determined by the processor and transmitted to each wheel unit via the communications assembly.

4. The detection method as claimed in claim 1, wherein the processor, in response to the received messages, emits series of messages to each wheel unit via the communications assembly, and each wheel unit establishes and records a second pattern representative of the location of the wheel unit in the motor vehicle, by measuring the power of the received messages and, during the evaluation step, each wheel unit measures a possible second variation in the associated second pattern and compares said second variation with a second predetermined threshold value, the location of the wheel in question is estimated to have changed if said measured second variation is greater than the second predetermined threshold value.

5. The detection method as claimed in claim 4, wherein the rate of emission of the series of messages by each wheel unit is adapted depending on the instantaneous variation in the second pattern of the wheel unit in question.

6. The detection method as claimed in claim 1, applied to a motor vehicle having four wheels which are each associated with one wheel unit, said wheels forming a first lateral pair and a second, opposite lateral pair, and also a first front pair and a second, opposite rear pair, the location of the wheels is estimated as unchanged if the measured variation in each pattern of two wheel units of one and the same pair of wheels is simultaneous.

7. The detection method as claimed in claim 1, wherein said motor vehicle has a plurality of processors, each processor being designed to communicate with each wheel unit via the bidirectional communications assembly.

8. The detection method as claimed in claim 1, wherein each pattern is established by measuring the power of the received messages.

9. A motor vehicle comprising at least one processor, two wheel units which each comprise an electronic assembly of sensors and which are each mounted on one of said wheels of the motor vehicle, and one bidirectional radiofrequency communications assembly designed to ensure communication between the wheel units and the processor, wherein said processor and/or said wheel units and/or said communications assembly are suitably programmed to implement the method as claimed in claim 1.

10. The detection method as claimed in claim 1, wherein the first pattern is depicted as a graph, with an abscissa axis indicating the number of the received messages and an ordinate axis indicating the power of the received messages.

11. The detection method as claimed in claim 4, wherein the second pattern is depicted as a graph, with an abscissa axis indicating the number of the received messages and an ordinate axis indicating the power of the received messages.

* * * * *

UNITED STATES PATENT AND TRADEMARK OFFICE
CERTIFICATE OF CORRECTION

| | | |
|---|---|---|
| PATENT NO. | : 12,059,931 B2 | Page 1 of 1 |
| APPLICATION NO. | : 18/024561 | |
| DATED | : August 13, 2024 | |
| INVENTOR(S) | : Nicolas Guinart, Jean-Philippe Boisset and Sylvain Godet | |

It is certified that error appears in the above-identified patent and that said Letters Patent is hereby corrected as shown below:

On the Title Page

Item (72) Inventors: Change "Jean-Phillippe Boisset" to -- Jean-Philippe Boisset --.

Signed and Sealed this
Eighteenth Day of February, 2025

Coke Morgan Stewart
*Acting Director of the United States Patent and Trademark Office*